(12) United States Patent
Hayashi

(10) Patent No.: US 9,671,261 B2
(45) Date of Patent: Jun. 6, 2017

(54) ULTRASONIC FLOWMETER HAVING MULTILAYER ULTRASONIC WAVE DAMPER

(71) Applicant: Azbil Corporation, Tokyo (JP)

(72) Inventor: Tomohito Hayashi, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 14/905,607

(22) PCT Filed: May 13, 2014

(86) PCT No.: PCT/JP2014/062694
§ 371 (c)(1),
(2) Date: Jan. 15, 2016

(87) PCT Pub. No.: WO2015/008526
PCT Pub. Date: Jan. 22, 2015

(65) Prior Publication Data
US 2016/0153816 A1     Jun. 2, 2016

(30) Foreign Application Priority Data
Jul. 17, 2013  (JP) .................................. 2013-148926

(51) Int. Cl.
*G01F 1/66* (2006.01)
(52) U.S. Cl.
CPC ................ *G01F 1/66* (2013.01); *G01F 1/662* (2013.01); *G01F 1/667* (2013.01)
(58) Field of Classification Search
None
See application file for complete search history.

(56) References Cited

U.S. PATENT DOCUMENTS 5,489,180 A * 2/1996 Ichihara .................... B32B 7/02
411/544
5,939,179 A * 8/1999 Yano ....................... B32B 15/08
428/212

(Continued)

FOREIGN PATENT DOCUMENTS

JP    S61-028821 A    2/1986
JP    S61-055696 A    3/1986

(Continued)

OTHER PUBLICATIONS

Japanese Application No. 2013-148926, filed Jul. 17, 2013.

*Primary Examiner* — Harshad R Patel
(74) *Attorney, Agent, or Firm* — Amster, Rothstein & Ebenstein, LLP

(57) ABSTRACT

To provide an ultrasonic flowmeter that prevents reduction in S/N ratio by suppressing the movement of a damping material applied to the pipe of the ultrasonic flowmeter, an ultrasonic flowmeter is provided. The ultrasonic flowmeter includes a first ultrasonic transceiver provided on a part of an outer periphery on an upstream side of a pipe in which gas flows, the first ultrasonic transceiver transmitting and receiving an ultrasonic wave, a second ultrasonic transceiver provided on a part of the outer periphery on a downstream side of the pipe, the second ultrasonic transceiver transmitting and receiving an ultrasonic wave, a main unit measuring a flow quantity of the gas, an ultrasonic absorber provided on the outer periphery of the pipe, the ultrasonic absorber including a first rubber layer formed on the outer periphery of the pipe and a second rubber layer formed on the first rubber layer.

6 Claims, 12 Drawing Sheets

(56) References Cited

U.S. PATENT DOCUMENTS

| | | | |
|---|---|---|---|
| 6,626,049 B1 | 9/2003 | Ao | |
| 2003/0172743 A1* | 9/2003 | Ao | G01F 1/667 |
| | | | 73/861.27 |
| 2013/0133408 A1* | 5/2013 | Lang | G01F 1/662 |
| | | | 73/64.53 |

FOREIGN PATENT DOCUMENTS

| | | |
|---|---|---|
| JP | S63-160830 A | 7/1988 |
| JP | H1-150545 A | 6/1989 |

\* cited by examiner

| Ultrasonic Absorber Material | S/N Ratio |
|---|---|
| Uncrosslinked Butyl Rubber | 7.4 |
| Asphalt | 3.8 |
| Nr (Natural Rubber) | 3.1 |
| Nbr (Nitrile Rubber) | 2.6 |
| Sbr (Styrene-Butadiene Rubber) | 1.8 |
| Polyvinyl Chloride Rubber | 1.8 |
| Cr (Chloroprene Rubber) | 1.7 |

Fig. 8

| Ultrasonic Absorber Material | Mixed Particle | S/N Ratio |
|---|---|---|
| Uncrosslinked Butyl Rubber | None | 7.4 |
| Uncrosslinked Butyl Rubber | Ferrite | 8.9 |
| Uncrosslinked Butyl Rubber | Tungsten | 11.7 |
| Uncrosslinked Butyl Rubber | Barium Sulfate | 34.2 |

Fig. 9

ULTRASONIC FLOWMETER HAVING MULTILAYER ULTRASONIC WAVE DAMPER

CROSS-REFERENCE TO RELATED APPLICATIONS

This application is a National Stage entry under 35 U.S.C. 371 of International Patent Application No. PCT/JP2014/062694, filed on May 13, 2014, which claims the benefit of and priority to Japanese Patent Application No. 2013-148926, filed on Jul. 17, 2013, the entire contents of each of which are incorporated by reference herein.

TECHNICAL FIELD

The present invention relates to an ultrasonic flowmeter and, more particularly, to an ultrasonic flowmeter for measuring the flow quantity of a fluid flowing through a pipe.

BACKGROUND ART

As this type of ultrasonic flowmeter, an ultrasonic flowmeter is known that has an ultrasonic transceiver on each of the outer periphery upstream of a pipe and the outer periphery downstream of the pipe, measures the propagation time by propagating an ultrasonic wave in the flow direction of a fluid and the propagation time by propagating an ultrasonic wave in the opposite direction, and calculates the flow velocity of the fluid based on the propagation times. In this type of flowmeter, an ultrasonic wave emitted from a transmitter reaches a receiver as a fluid propagation wave propagating in the fluid and reaching the receiver and a pipe propagation wave propagating in the pipe wall and reaching the receiver. The fluid propagation wave is a signal component required for measurement and the pipe propagation wave is a noise component superimposed on the signal component.

For attenuation of this noise component, a damping material (ultrasonic absorber) for attenuating the energy of the pipe propagation wave is formed cylindrically on the outer wall of the pipe between two ultrasonic transceivers to improve the S/N ratio (signal-to-noise ratio). For example, PTL 1 discloses an example of an ultrasonic flowmeter provided with a damping material on the pipe.

CITATION LIST

Patent Literature

PTL 1: U.S. Pat. No. 6,626,049

SUMMARY OF INVENTION

Technical Problem

Preferably, the damping material is selected and the film thickness of the damping material is increased to further attenuate the energy of the above pipe propagation wave. If the amount of the energy of the pipe propagation wave is further absorbed by the damping material, the S/N ratio in the measurement is improved. For example, when the pressure of the fluid is low, the signal energy of the fluid propagation wave reduces and the S/N ratio becomes low. However, if the thickness of the damping material increases, the energy of the pipe propagation wave reduces and reduction in the S/N ratio can be suppressed.

In many cases, the main material of such a damping material is rubber. When a soft damping material including rubber as the main material is formed as a thick film on the outer wall of a pipe, the damping material moves due to its own weight over a long period of time and the thickness may become uneven. If the damping material includes particles for adjusting the acoustic impedance, its weight further increases and the thickness becomes uneven more easily. When the thickness of the damping material covering the pipe surface becomes uneven, the damping performance degrades and the S/N ratio of the ultrasonic flowmeter reduces.

Accordingly, an object of the invention is to provide an ultrasonic flowmeter that prevents the S/N ratio from reducing by suppressing the movement of a damping material applied to the pipe of the ultrasonic flowmeter. In addition, another object of the invention is to provide a damping material best suited to an ultrasonic flowmeter.

Solution to Problem

To achieve the above object, according to an aspect of the present invention, there is provided an ultrasonic flowmeter including a first ultrasonic transceiver provided on a part of an outer periphery on an upstream side of a pipe in which gas flows, the first ultrasonic transceiver transmitting and receiving an ultrasonic wave, a second ultrasonic transceiver provided on a part of the outer periphery on a downstream side of the pipe, the second ultrasonic transceiver transmitting and receiving an ultrasonic wave, a main unit measuring a flow quantity of the gas based on a time from when the ultrasonic wave transmitted from the first ultrasonic transceiver to when the ultrasonic wave is received by the second ultrasonic transceiver and a time from when the ultrasonic wave transmitted from the second ultrasonic transceiver to when the ultrasonic wave is received by the first ultrasonic transceiver, and an ultrasonic absorber provided on the outer periphery of the pipe, the ultrasonic absorber absorbing a pipe propagation wave, the pipe propagation wave being the ultrasonic wave propagating in the pipe, in which the ultrasonic absorber includes a first rubber layer formed on the outer periphery of the pipe and a second rubber layer formed on the first rubber layer, and the first rubber layer has a viscoelasticity larger (softer) than the second rubber layer and the second rubber layer has a viscoelasticity smaller (harder) than the first rubber layer and surrounds the first rubber layer.

In this structure, the first rubber layer, which is softer, of the ultrasonic absorber absorbs the pipe propagation wave and the second rubber layer, which is harder, prevents the deformation of the ultrasonic absorber.

Preferably, particles in the rubber layers need to be adjusted so that the first rubber layer and the second rubber layer have the same acoustic impedance. When the two rubber layers have the same acoustic impedance, occurrence of the reflection of the pipe propagation wave is prevented on the rubber layer interface, the pipe propagation wave diffuses into the first rubber layer and the second rubber layer, and the energy of the pipe propagation wave is absorbed. This adjustment is performed by, for example, adjusting the particles included in the first rubber layer and the particles included in the second rubber layer to have the same total weight. Metal particles (tungsten, ferrite, barium sulfate, and the like) may be used as the above particles.

According to another aspect of the invention, there is provided an ultrasonic absorber for an ultrasonic flowmeter measuring a flow quantity of gas based on a time from when an ultrasonic wave transmitted from a part of an outer periphery on an upstream side of a pipe in which the gas flows to when the ultrasonic wave is received by a part of the outer periphery on a downstream side of the pipe and a time from when an ultrasonic wave transmitted from the part of the outer periphery on the downstream side of the pipe to when the ultrasonic wave is received by the part of the outer periphery on the upstream side of the pipe, the ultrasonic absorber including a first rubber layer formed on the outer periphery of the pipe and a second rubber layer formed on the first rubber layer, in which the first rubber layer has a viscoelasticity larger (softer) than the second rubber layer and the second rubber layer has a viscoelasticity smaller (harder) than the first rubber layer and surrounds the first rubber layer.

In this structure, since the outer periphery made of the soft first rubber layer is held by the hard second rubber layer, the deformation of the first rubber layer can be prevented.

Preferably, an acoustic impedance of the first rubber layer is made equal to an acoustic impedance of the second rubber layer by adjusting a total weight of particles included in the first rubber layer and a total weight of particles included in the second rubber layer. This diffuses the pipe propagation wave into the first and second rubber layers and attenuates the energy of noise components.

Advantageous Effects of Invention

Since the time-dependent deformation of the ultrasonic absorber (damping material) covering the pipe is suppressed in the invention, reduction in the damping performance of the ultrasonic absorber with respect to the pipe propagation wave can be suppressed. Since the deformation of the ultrasonic absorber covering the pipe is small, the time-dependent degradation of the S/N ratio of the ultrasonic flowmeter is prevented.

BRIEF DESCRIPTION OF DRAWINGS

FIG. 8 is an explanatory diagram illustrating an example of an ultrasonic absorber.

FIG. 9 is an explanatory diagram illustrating examples of particles mixed into the ultrasonic absorber to adjust an acoustic impedance.

DESCRIPTION OF EMBODIMENTS

Figure 1:
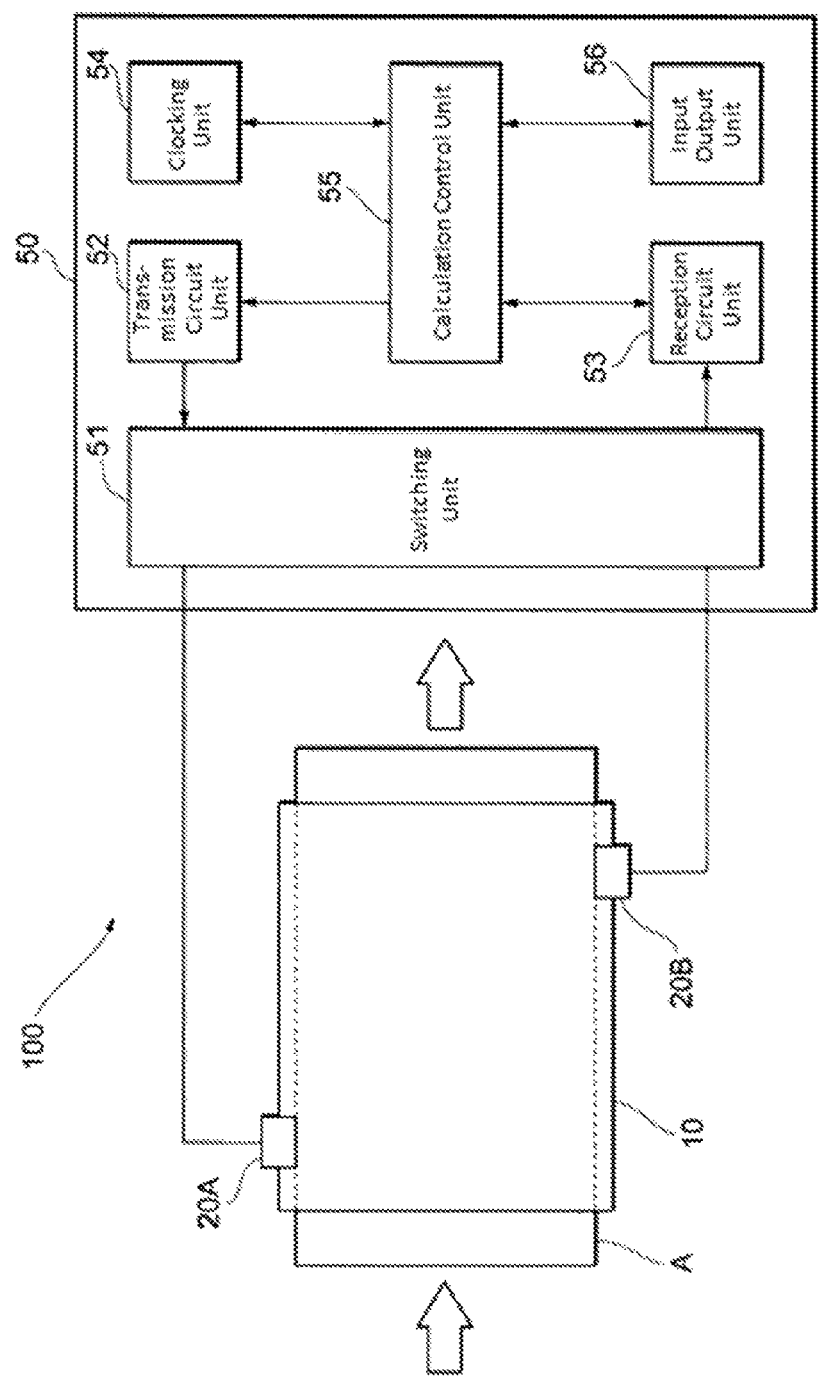
FIG. 1 is an explanatory diagram illustrating an ultrasonic flowmeter used in the present invention.

An embodiment of the present invention will be described below. In the following description of drawings, the same or similar components are given the same or similar reference numerals. However, since the drawings are illustrated schematically, specific dimensions and the like should be determined with reference to the following descriptions. In addition, it is appreciated that there are differences in the relationship between dimensions and the ratio of dimensions between drawings. In the following descriptions, the upper side in the drawings is referred to as "upward", the lower side is referred to as "downward", the left side is referred to as "left", and the right side is referred to as "right".

FIGS. 1 to 13 illustrate an ultrasonic flowmeter and an ultrasonic absorber for an ultrasonic flowmeter according to an embodiment of the invention. FIG. 1 is a structural diagram illustrating an example of the schematic structure of an ultrasonic flowmeter 100. As illustrated in FIG. 1, the ultrasonic flowmeter 100 measures the flow quantity of gas flowing in a pipe A. The gas to be measured by the ultrasonic flowmeter 100 flows in the direction (the direction from left to right in FIG. 1) indicated by the hollow arrow in FIG. 1. The ultrasonic flowmeter 100 includes a first ultrasonic transceiver 20A, a second ultrasonic transceiver 20B, a main unit 50, and an ultrasonic absorber 10.

The first ultrasonic transceiver 20A and the second ultrasonic transceiver 20B are provided on the outer periphery of the pipe A. In the example illustrated in FIG. 1, the first ultrasonic transceiver 20A is disposed on the upstream side of the pipe A and the second ultrasonic transceiver 20B is disposed on the downstream side of the pipe A. The first ultrasonic transceiver 20A and the second ultrasonic transceiver 20B transmit and receive an ultrasonic wave and transmit and receive an ultrasonic wave to each other. That is, the ultrasonic wave transmitted by the first ultrasonic transceiver 20A is received by the second ultrasonic transceiver 20B and the ultrasonic wave transmitted by the second ultrasonic transceiver 20B is received by the first ultrasonic transceiver 20A.

Figure 2:
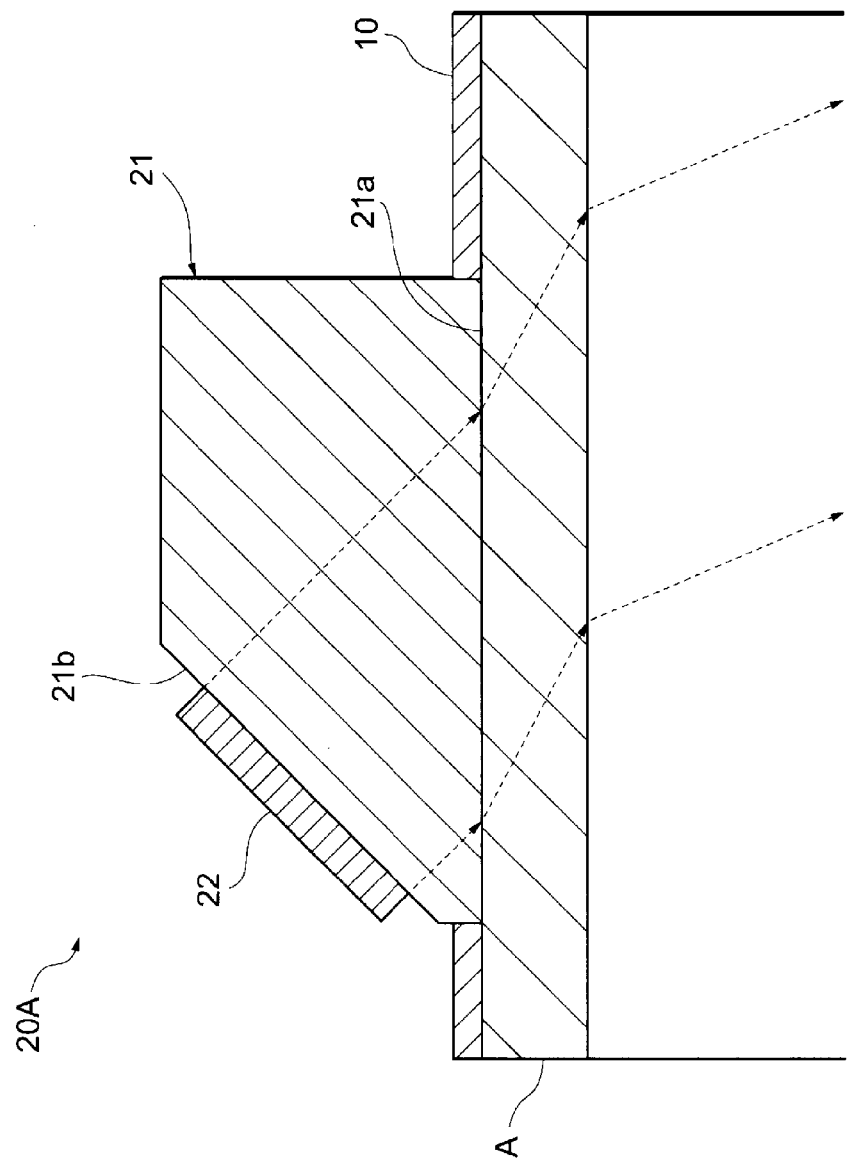
FIG. 2 is an explanatory diagram illustrating an ultrasonic transceiver of the ultrasonic flowmeter.

FIG. 2 is an enlarged cross sectional view illustrating the structure of the first ultrasonic transceiver 20A illustrated in FIG. 1. As illustrated in FIG. 2, the first ultrasonic transceiver 20A includes a wedge 21 and a piezoelectric element 22.

The wedge 21 causes an ultrasonic wave to enter the outer peripheral surface of the pipe A at a predetermined angle and is made of resin or metal. The wedge 21 is mounted so that a bottom surface 21a makes contact with the outer peripheral surface of the pipe A. In addition, the wedge 21 has an oblique surface 21b forming a predetermined angle with respect to the bottom surface 21a. The piezoelectric element 22 is mounted on the oblique surface 21b.

Although the embodiment illustrates an example in which the bottom surface 21a makes contact with the outer peripheral surface of the pipe A, the invention is not limited to the embodiment. A couplant may intervene between the bottom surface 21a and the outer peripheral surface of the pipe A.

The piezoelectric element 22 transmits an ultrasonic wave and receives an ultrasonic wave. A lead wire (not illustrated)

is electrically connected to the piezoelectric element 22. When an electric signal having a predetermined frequency is applied via the lead wire, the piezoelectric element 22 oscillates at the predetermined frequency and generates an ultrasonic wave. This transmits the ultrasonic wave. As illustrated by the dashed arrows in FIG. 2, the ultrasonic wave transmitted by the piezoelectric element 22 propagates in the wedge 21 at the angle of the oblique surface 21b. The ultrasonic wave propagating in the wedge 21 is refracted on the interface between the wedge 21 and the outer wall of the pipe A to change its incident angle, further refracted on the interface between the inner wall of the pipe A and the gas flowing in the pipe A to change its incident angle, and propagates in the gas. Since refraction on the interface is performed based on the Snell's law, by setting the angle of the oblique surface 21b in advance based on the velocity of the ultrasonic wave during propagation in the pipe A and the velocity of the ultrasonic wave during propagation in the gas, it is possible to cause the ultrasonic wave to enter the gas at a desired incident angle and propagate in the gas.

On the other hand, when the ultrasonic wave reaches the piezoelectric element 22, the piezoelectric element 22 oscillates at the frequency of the ultrasonic wave and generates an electric signal. Accordingly, the ultrasonic wave is received. The electric signal generated from the piezoelectric element 22 is detected by a main unit 50, which will be described later, via the lead wire.

The second ultrasonic transceiver 20B has a structure similar to that of the first ultrasonic transceiver 20A. That is, the second ultrasonic transceiver 20B also includes the wedge 21 and the piezoelectric element 22. Since the first ultrasonic transceiver 20A has been described above, the second ultrasonic transceiver 20B is not described in detail.

The main unit 50 illustrated in FIG. 1 measures the flow quantity of gas flowing in the pipe A based on the time required for the ultrasonic wave to propagate in the gas. Generally, the main unit 50 includes a switching unit 51, a transmission circuit unit 52, a reception circuit unit 53, a clocking unit 54, a calculation control unit 55, and an input output unit 56.

The switching unit 51 performs switching between transmission and reception of an ultrasonic wave. The switching unit 51 is connected to the first ultrasonic transceiver 20A and the second ultrasonic transceiver 20B. The switching unit 51 may be configured to have, for example, a changeover switch or the like. Based on a control signal input from the calculation control unit 55, the switching unit 51 switches the changeover switch to connect one of the first ultrasonic transceiver 20A and the second ultrasonic transceiver 20B to the transmission circuit unit 52 and connect the other of the first ultrasonic transceiver 20A and the second ultrasonic transceiver 20B to the reception circuit unit 53. This allows one of the first ultrasonic transceiver 20A and the second ultrasonic transceiver 20B to transmit an ultrasonic wave and the other of the first ultrasonic transceiver 20A and the second ultrasonic transceiver 20B to receive the ultrasonic wave.

The transmission circuit unit 52 causes the first ultrasonic transceiver 20A and the second ultrasonic transceiver 20B to transmit an ultrasonic wave. The transmission circuit unit 52 may be configured to have, for example, an oscillating circuit generating a rectangular wave having a predetermined frequency, a driving circuit driving the first ultrasonic transceiver 20A and the second ultrasonic transceiver 20B, and so on. Based on a control signal input from the calculation control unit 55, in the transmission circuit unit 52, the driving circuit outputs the rectangular wave generated by the oscillating circuit to the piezoelectric element 22 of one of the first ultrasonic transceiver 20A and the second ultrasonic transceiver 20B as a driving signal. This drives the piezoelectric element 22 of one of the first ultrasonic transceiver 20A and the second ultrasonic transceiver 20B and the piezoelectric element 22 transmits an ultrasonic wave.

The reception circuit unit 53 detects an ultrasonic wave received by the first ultrasonic transceiver 20A and the second ultrasonic transceiver 20B. The reception circuit unit 53 may be configured to have, for example, an amplifying circuit amplifying a signal at a predetermined gain, a filtering circuit filtering an electric signal having a predetermined frequency, and so on. The reception circuit unit 53 amplifies an electric signal output from the piezoelectric element 22 of one of the first ultrasonic transceiver 20A and the second ultrasonic transceiver 20B based on the control signal input from the calculation control unit 55, filters the signal, and then converts the signal into a reception signal. The reception circuit unit 53 outputs the converted reception signal to the calculation control unit 55.

The clocking unit 54 measures time in a predetermined period. The clocking unit 54 may include, for example, an oscillating circuit. The oscillating circuit may be shared with the transmission circuit unit 52. The clocking unit 54 measures time by counting the number of reference waves from the oscillating circuit based on a start signal and stop signal input from the calculation control unit 55. The clocking unit 54 outputs the measured time to the calculation control unit 55.

The calculation control unit 55 calculates the flow quantity of gas flowing in the pipe A by computation. The calculation control unit 55 may include, for example, a CPU, memories such as a ROM and a RAM, an input-output interface, and so on. In addition, the calculation control unit 55 controls the switching unit 51, the transmission circuit unit 52, the reception circuit unit 53, the clocking unit 54, the input output unit 56, and other units of the main unit 50. How the calculation control unit 55 calculates the flow quantity of gas will be described later.

The input output unit 56 is used by the user to input information and used to output information to the user. The input output unit 56 may include, for example, input means such as an operation button, output means such as a monitor display, and so on. When the user operates an operation button or the like, various types of information such as settings are input to the calculation control unit 55 via the input output unit 56. In addition, the input output unit 56 displays and outputs, to the monitor display or the like, information such as the flow quantity of gas, the velocity of gas, the accumulated flow quantity in a predetermined period calculated by the calculation control unit 55.

Figure 3:
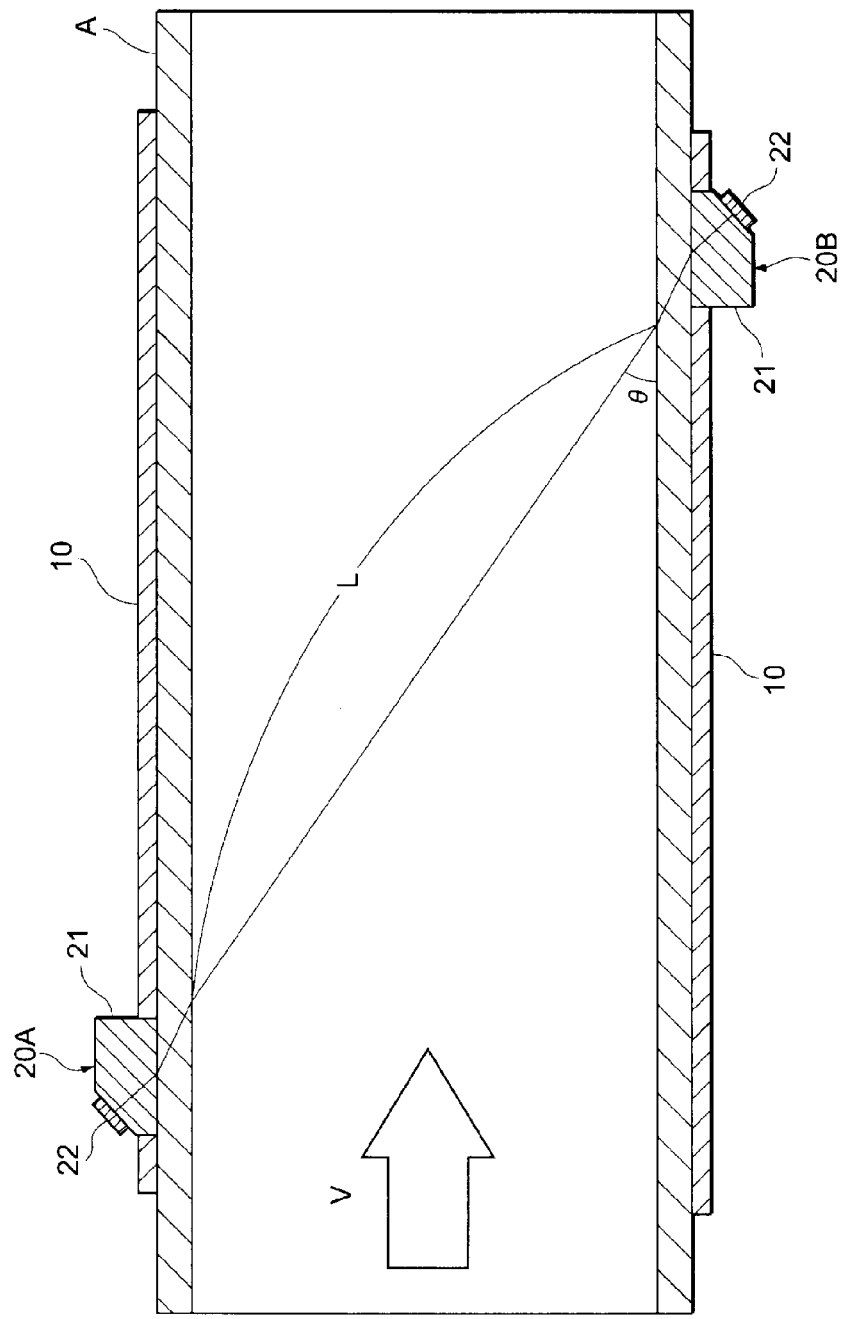
FIG. 3 is an explanatory diagram illustrating the operation principle of the ultrasonic flowmeter.

FIG. 3 is a side sectional view illustrating the method for calculating the flow quantity of the gas flowing in the pipe A. As illustrated in FIG. 3, it is assumed that the velocity (referred to below as the flow velocity) of gas flowing in the pipe A in a predetermined direction (from left to right in FIG. 3) is V [m/s], the velocity (referred to below as the sound velocity) at which an ultrasonic wave propagates in the gas is C [m/s], the propagation path length of the ultrasonic wave propagating in the gas is L [m], and the angle formed by the pipe axis of the pipe A and the propagation path of the ultrasonic wave is θ.

When the first ultrasonic transceiver 20A installed on the upstream side (the left side in FIG. 3) of the pipe A transmits an ultrasonic wave and the second ultrasonic transceiver 20B installed on the downstream side (the right side in FIG. 3) of the pipe A receives the ultrasonic wave, the propagation time $t_{12}$ required for the ultrasonic wave to propagate in the gas in the pipe A is represented by expression (1) below.

$$t_{12}=L/(C+V\cos\theta) \quad (1)$$

In contrast, when the second ultrasonic transceiver 20B installed on the downstream side of the pipe A transmits an ultrasonic wave and the first ultrasonic transceiver 20A installed on the upstream side of the p ipe A receives the ultrasonic wave, the propagation time $t_{21}$ required for the ultrasonic wave to propagate in the gas in the pipe A is represented by expression (2) below.

$$t_{21}=L/(C-V\cos\theta) \quad (2)$$

Base on expression (1) and expression (2), the flow velocity V of the gas is represented by expression (3) below.

$$V=(L/2\cos\theta)\cdot\{(1/t_{12})-(1/t_{21})\} \quad (3)$$

Since propagation path length L and angle θ are known before measurement of the flow quantity in expression (3), flow velocity V can be calculated based on expression (3) by measuring propagation time $t_{12}$ and propagation time $t_{21}$.

Then, flow quantity Q [m³/s] of the gas flowing in the pipe A is represented by the expression (4) below using flow velocity V [m/s], complementary coefficient K and cross sectional area S [m³/s] of the pipe A.

$$Q=KVS \quad (4)$$

Accordingly, the calculation control unit 55 stores propagation path length L, angle θ, complementary coefficient K, and cross sectional area S of the pipe A in a memory or the like in advance. Then, the calculation control unit 55 can calculate flow quantity Q of the gas flowing in the pipe A based on expressions (3) and (4) by measuring propagation time $t_{12}$ and propagation time $t_{21}$ using the clocking unit 54 based on a reception signal input from the reception circuit unit 53.

Although the present embodiment indicates an example of calculating the flow quantity of the gas in the propagation time inverse difference method using FIG. 3 and expressions (1) to (4), the invention is not limited to this example. The calculation control unit 55 may calculate the flow quantity of the gas using another method (for example, a well-known propagation time difference method).

Although the present embodiment indicates an example in which an ultrasonic wave transmitted by one of the first ultrasonic transceiver 20A and the second ultrasonic transceiver 20B propagates in the gas in the pipe A and is received by the other of the first ultrasonic transceiver 20A and the second ultrasonic transceiver 20B, the invention is not limited to this example. For example, both the first ultrasonic transceiver 20A and the second ultrasonic transceiver 20B may be disposed on the same side of the pipe A and an ultrasonic wave reflected like a V-shape once on the inner wall of the pipe A and then propagating in the gas may be measured. In addition, an ultrasonic wave reflected n times (n is a natural number) on the inner wall of the pipe A may be received.

The ultrasonic absorber 10 illustrated in FIG. 1 is provided on the outer peripheral surface of the pipe A. Specifically, the ultrasonic absorber 10 is disposed on the outer peripheral surface of the pipe A so as to cover at least the region between the first ultrasonic transceiver 20A and the second ultrasonic transceiver 20B and fixed to the outer peripheral surface of the pipe A in a close contact manner. The parts of the ultrasonic absorber 10 in which the first ultrasonic transceiver 20A and the second ultrasonic transceiver 20B are mounted are cut out like a rectangular shape so that the first ultrasonic transceiver 20A and the second ultrasonic transceiver 20B make direct contact with the outer peripheral surface of the pipe A. The main material of the ultrasonic absorber 10 may be, for example, uncrosslinked butyl rubber (IIR, isobutylene-isoprene copolymer).

Figure 4:
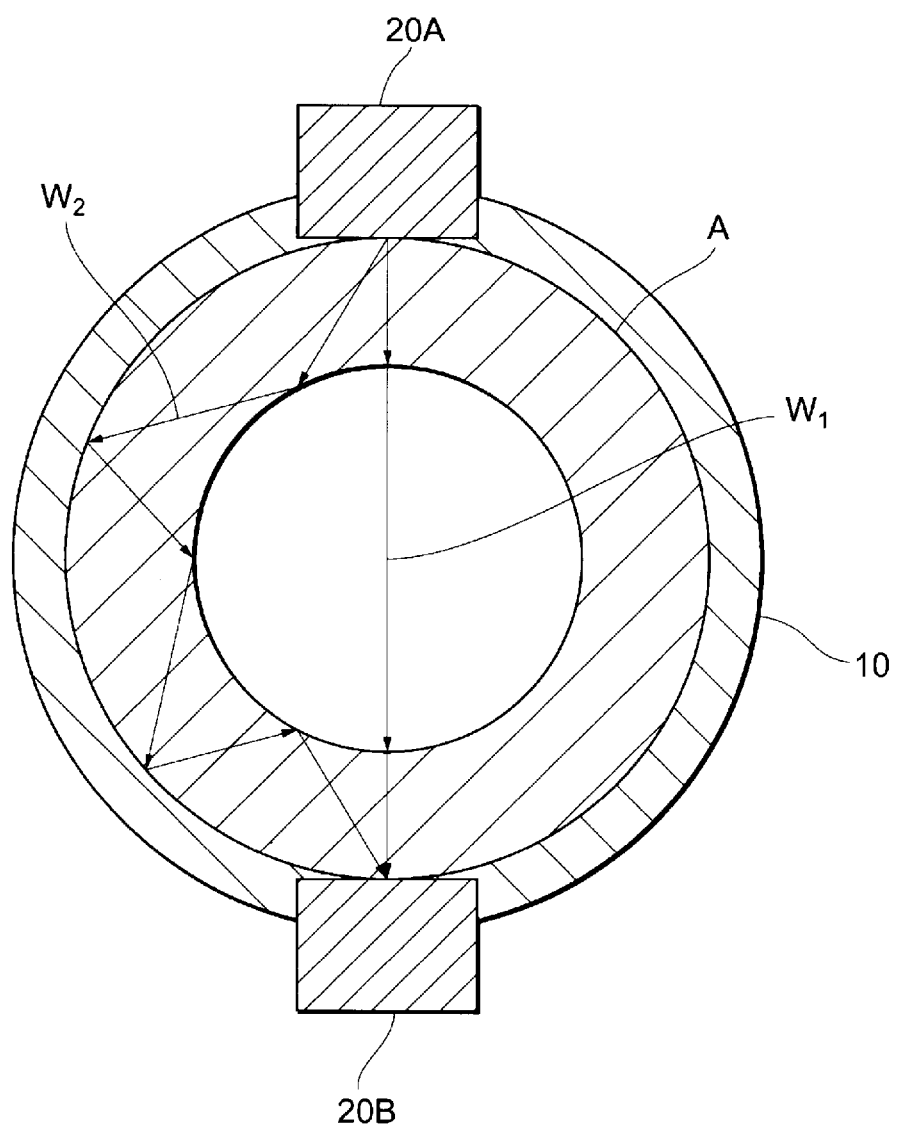
FIG. 4 is an explanatory diagram illustrating an ultrasonic signal and a pipe propagation wave in the ultrasonic flowmeter.

FIG. 4 is a cross sectional view illustrating how an ultrasonic wave transmitted from the first ultrasonic transceiver 20A is received by the second ultrasonic transceiver 20B. The example in this drawing indicates the case in which the ultrasonic absorber 10 is formed as one layer for the purpose of explanation, but the ultrasonic absorber 10 is formed as a plurality of layers in the characteristic structure in the following example.

As illustrated in FIG. 4, an ultrasonic wave transmitted from, for example, the first ultrasonic transceiver 20A is divided into a gas propagation wave $W_1$ passing through (penetrating through) the pipe A and propagating in the gas in the pipe A and a pipe propagation wave $W_2$ propagating in the pipe A. The gas propagation wave $W_1$ passes through the pipe A again and reaches the second ultrasonic transceiver 20B. On the other hand, the pipe propagation wave $W_2$ may also reach the second ultrasonic transceiver 20B while being reflected a plurality of times on the inner wall and the outer wall of the pipe A. Although not illustrated or described in detail, as the ultrasonic wave transmitted from the first ultrasonic transceiver 20A, an ultrasonic wave transmitted from the second ultrasonic transceiver 20B is also divided into the gas propagation wave $W_1$ and the pipe propagation wave $W_2$, the gas propagation wave $W_1$ passes through the pipe A and reaches the first ultrasonic transceiver 20A, and the pipe propagation wave $W_2$ may reach the first ultrasonic transceiver 20A while being reflected a plurality of times on the inner wall and the outer wall of the pipe A.

Generally, whether the sonic wave propagating in one medium penetrates through (passes through) an interface with another medium or reflects on the interface depends on the difference in the acoustic impedance between the one medium and the other medium. That is, as the difference in the acoustic impedance is smaller, the sonic wave propagating in the one medium is apt to penetrate through the other medium. In contrast, as the difference in the acoustic impedance is larger, the sonic wave propagating in the one medium is apt to reflect on the interface with the other medium.

When the fluid flowing in the pipe A is, for example, liquid, since the difference between the acoustic impedance of liquid and the acoustic impedance of the material (for example, metal such as stainless steel (SUS) or a high molecular compound such as synthetic resin) of the pipe is relatively small, the ratio (transmission factor) of the ultrasonic wave penetrating through (passing through) the pipe A and propagating in the liquid flowing in the pipe A is large (that is, the ratio (reflectivity) of the ultrasonic wave reflecting on the pipe wall of the pipe A is small) and (the magnitude or intensity of) the energy of the pipe propagation wave $W_2$ is small. On the other hand, the acoustic impedance of gas is smaller than the acoustic impedance of liquid. Accordingly, when the fluid flowing in the pipe A is gas, since the difference between the acoustic impedance of gas and the acoustic impedance of the pipe A is relatively large, the ratio (transmission factor) of the ultrasonic wave penetrating through (passing through) the pipe A and propagating in the liquid flowing in the pipe A is small (that is, the ratio (reflectivity) of the ultrasonic wave reflecting on the pipe wall of the pipe A is large) and (the magnitude or intensity of) the energy of the pipe propagation wave $W_2$ is large.

In the ultrasonic flowmeter that receives the gas propagation wave $W_1$ of the ultrasonic wave, measures the propagation time, and measures the flow quantity based on the propagation time, the gas propagation wave $W_1$ is a signal (signal component S) to be detected and the pipe propagation wave $W_2$ is noise (noise component N) of a signal. Accordingly, unless (the magnitude or intensity of) the pipe propagation wave $W_2$ is sufficiently smaller than (the magnitude or intensity of) the gas propagation wave $W_1$, identification between the gas propagation wave $W_1$ and the pipe propagation wave $W_2$ becomes difficult. As a result, the propagation time is calculated based on mistaken identification between the gas propagation wave $W_1$ and the pipe propagation wave $W_2$ and the flow quantity of gas may be measured based on the mistaken propagation time.

The ultrasonic absorber 10 is provided on the outer periphery of the pipe A and absorbs the pipe propagation wave $W_2$ propagating in the pipe A. In addition, the ultrasonic absorber 10 includes uncrosslinked butyl rubber as described above. Uncrosslinked butyl rubber has an acoustic impedance close to that of the material of the pipe A and has high capability (absorption performance) of absorbing vibrations in the frequency band of ultrasonic waves. Accordingly, the ultrasonic absorber 10 can attenuate the pipe propagation wave $W_2$ that is propagating in the pipe A and can sufficiently reduce (the magnitude or intensity of) the energy of the pipe propagation wave $W_2$ reaching (that is, received by) the first ultrasonic transceiver 20A and the second ultrasonic transceiver 20B as compared with (the magnitude or intensity of) the energy of the gas propagation wave $W_1$, thereby improving the S/N ratio (the ratio between the maximum amplitude value of the gas propagation wave $W_1$ and the maximum amplitude value of the pipe propagation wave $W_2$).

In addition, uncrosslinked butyl rubber is also a viscoelastic body having adherence and elasticity. Accordingly, the ultrasonic absorber 10 is apt to adhere, so it can be fixed to the outer periphery of the pipe A in a close contact manner. In addition, the ultrasonic absorber 10 is apt to be elastically deformed, so it can be easily provided on the pipe A having various materials, shapes, and surface states.

In addition, it has been confirmed experimentally that uncrosslinked butyl rubber has sufficient durability (environmental resistance) against, for example, temperature and humidity, in the use environment of the ultrasonic flowmeter 100. Accordingly, the ultrasonic absorber 10 can include uncrosslinked butyl rubber without crosslinking (vulcanization) by using sulfur or the like to improve the strength and environmental resistance.

Generally, an ultrasonic wave is a sonic wave having a frequency of 20 [kHz] or more. Accordingly, the ultrasonic wave transmitted by the first ultrasonic transceiver 20A and the second ultrasonic transceiver 20B is a sonic wave having a frequency of 20 [kHz] or more. Preferably, the ultrasonic wave transmitted by the first ultrasonic transceiver 20A and the second ultrasonic transceiver 20B is an ultrasonic wave in the frequency band from 100 [kHz] to 2.0 [MHz]. More preferably, the ultrasonic wave transmitted by the first ultrasonic transceiver 20A and the second ultrasonic transceiver 20B is an ultrasonic wave in the frequency band from 0.5 [MHz] to 1.0 [MHz]. In any case, the ultrasonic wave transmitted by the first ultrasonic transceiver 20A and the ultrasonic wave transmitted by the second ultrasonic transceiver 20B may have the same frequency or different frequencies.

Figure 5:
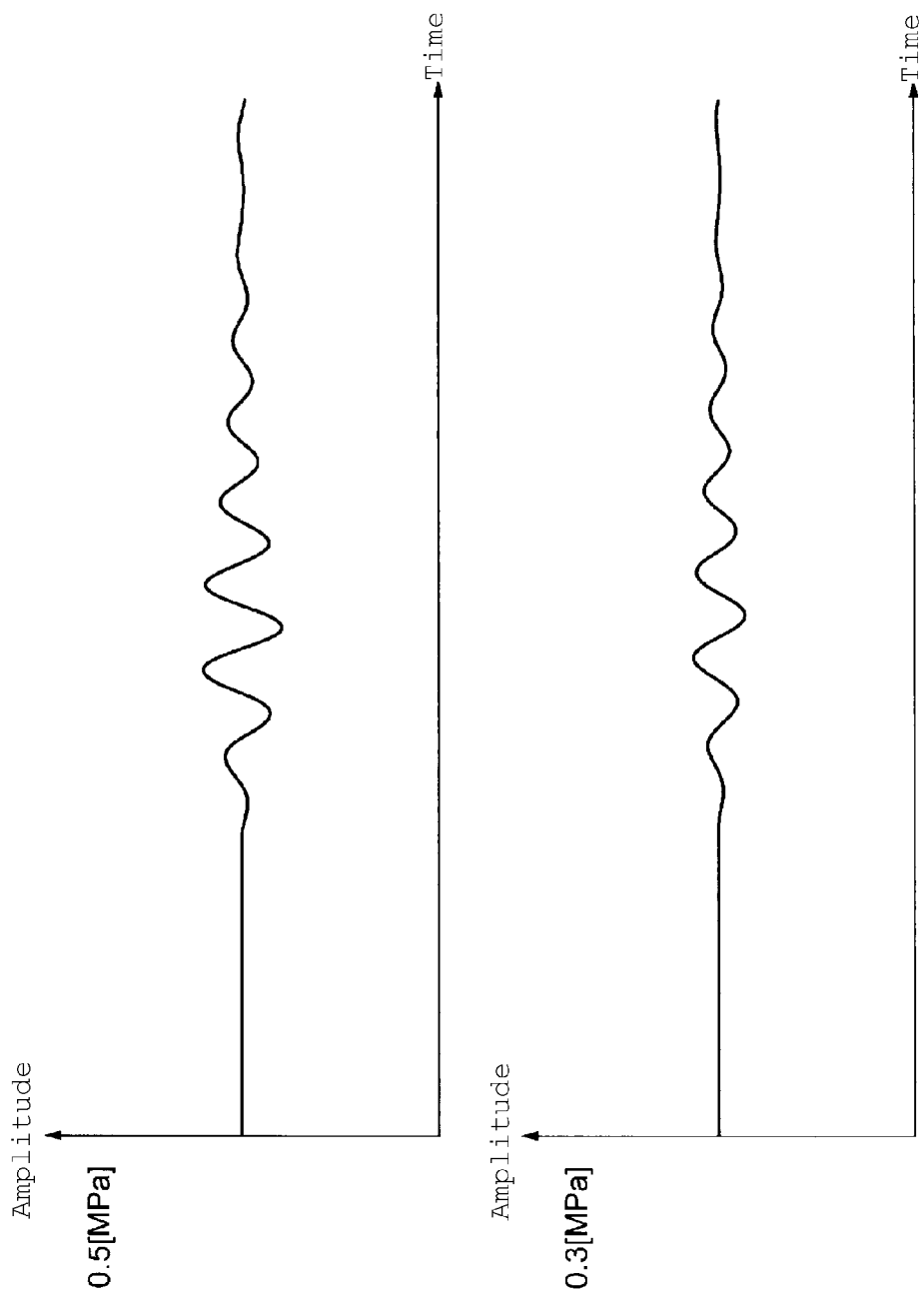
FIG. 5 is an explanatory diagram illustrating an example of a reception signal in the ultrasonic flowmeter.
Figure 6:
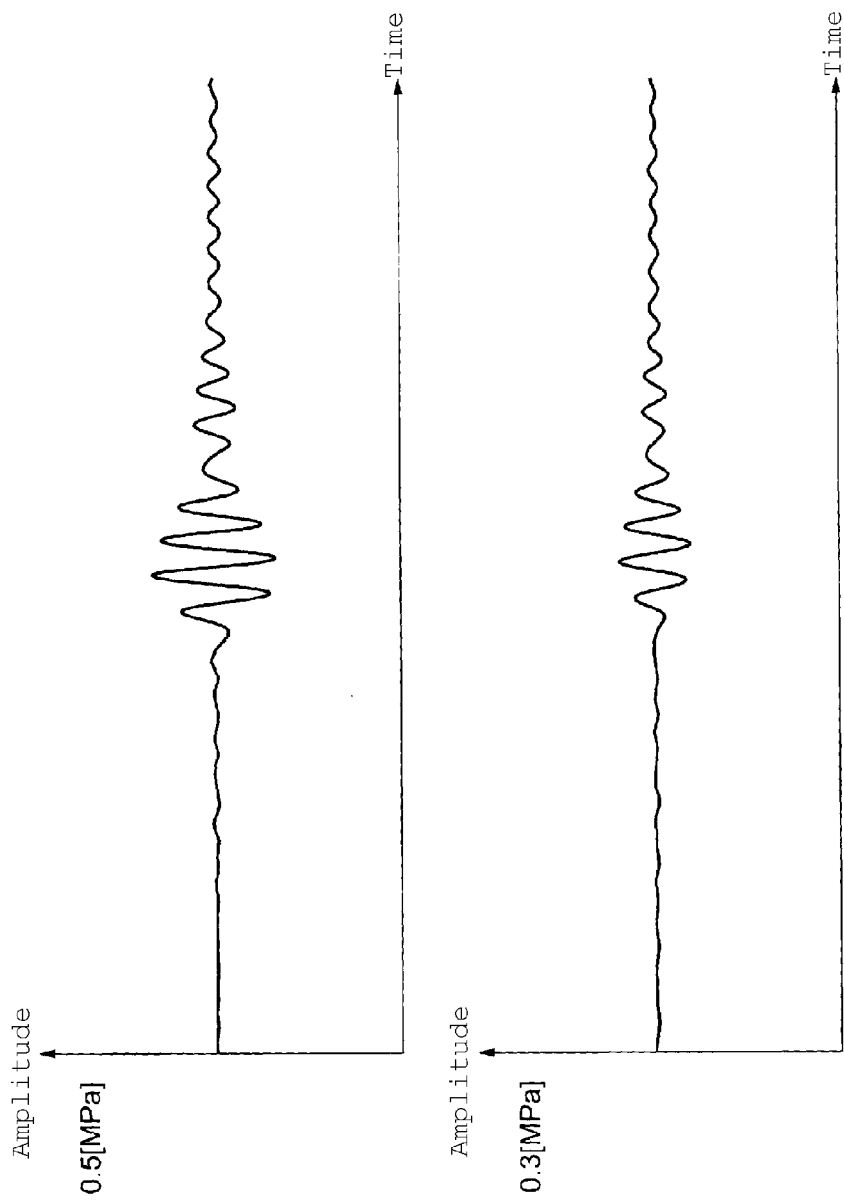
FIG. 6 is an explanatory diagram illustrating an example of the reception signal in the ultrasonic flowmeter.

FIGS. 5 and 6 are graphs illustrating reception signals output by the reception circuit unit 53 illustrated in FIG. 1.

In FIGS. 5 and 6, the horizontal axis represents the time and the vertical axis represents the amplitude (voltage). In addition, in FIGS. 5 and 6, the upper part is a graph indicating the case in which the pressure of gas flowing in the pipe A is 0.5 [MPa] and the lower part is a graph indicating the case in which the pressure of gas flowing in the pipe A is 0.3 [MPa]. In addition, FIG. 5 is a graph indicating the case in which the frequency of the ultrasonic wave transmitted by the first ultrasonic transceiver 20A and the second ultrasonic transceiver 20B is 0.5 [MHz] and FIG. 6 is a graph indicating the case in which the frequency of the ultrasonic wave transmitted by the first ultrasonic transceiver 20A and the second ultrasonic transceiver 20B is 1.0 [MHz].

As illustrated in the graph in the upper part of FIG. 5, when the pressure of gas is 0.5[MPa] and the ultrasonic wave transmitted by the first ultrasonic transceiver 20A and the second ultrasonic transceiver 20B has a frequency of 0.5 [MHz], the ultrasonic absorber 10 can attenuate the pipe propagation wave $W_2$ and the calculation control unit 55 can identify and detect the gas propagation wave $W_1$, having a relatively large amplitude, that appears approximately in the middle of the graph. In addition, as illustrated in the graph in the upper part of FIG. 6, when the pressure of gas is 0.5 [MPa] and the ultrasonic wave transmitted by the first ultrasonic transceiver 20A and the second ultrasonic transceiver 20B has a frequency of 1.0 [MHz], the ultrasonic absorber 10 can also attenuate the pipe propagation wave $W_2$ and the calculation control unit 55 can identify and detect the gas propagation wave $W_1$, having a relatively large amplitude, that appears approximately in the middle of the graph.

When the pressure of gas flowing in the pipe A is low (for example, the pressure of gas is lower than 0.5 [MPa]), since the acoustic impedance of gas is proportional to the pressure, the difference from the acoustic impedance of the pipe A further increases and (the magnitude or intensity of) the energy of the gas propagation wave $W_1$ further reduces. However, when the pressure of gas flowing in the pipe A is low (for example, even when the pressure of gas is 0.3 [MPa]), as illustrated in the graphs in the lower parts of FIGS. 5 and 6, the ultrasonic absorber 10 can attenuate the pipe propagation wave $W_2$ and the calculation control unit 55 can identify and detect the gas propagation wave $W_1$, having a relatively large amplitude, that appears approximately in the middle of the graph. As described above, even when (the magnitude or intensity of) the energy of the gas propagation wave $W_1$ is small, the ultrasonic absorber 10 can sufficiently attenuate the pipe propagation wave $W_2$ and improve the S/N ratio. Preferably, the S/N ratio is 2 or more experimentally.

Figure 7:
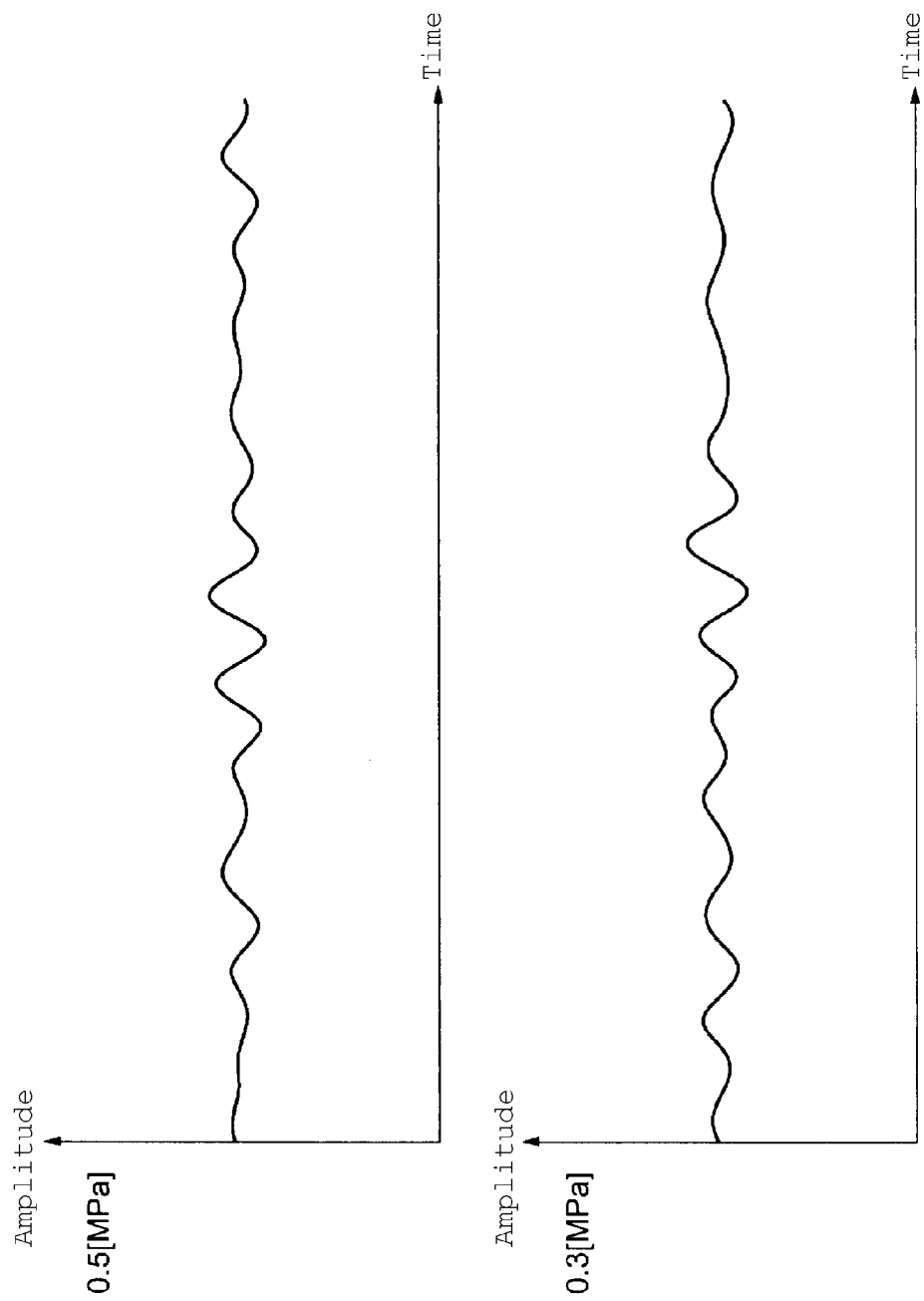
FIG. 7 is an explanatory diagram illustrating an example (when the S/N ratio is low) of the reception signal in the ultrasonic flowmeter.

FIG. 7 illustrates a reference example (when the absorption ratio of an ultrasonic wave is low) of the reception signal of an ultrasonic flowmeter having another ultrasonic absorber. It is assumed that the ultrasonic flowmeter in the reference example is the same as the ultrasonic flowmeter 100 except that the ultrasonic flowmeter has an ultrasonic absorber different from the ultrasonic absorber 10. In FIG. 7, the horizontal axis represents the time and the vertical axis represents the amplitude (voltage). In addition, in FIG. 7, the frequency of the ultrasonic wave is 0.5 [MHz], the upper part is a graph indicating the case in which the pressure of gas flowing in the pipe A is 0.5 [MPa] and the lower part is a graph indicating the case in which the pressure of gas flowing in the pipe A is 0.3 [MPa]. In a virtual ultrasonic flowmeter having another ultrasonic absorber including asphalt as the main material, as compared with the graph of the ultrasonic flowmeter 100 according to the embodiment illustrated in FIG. 5, the ultrasonic absorber cannot attenuate the pipe propagation wave $W_2$ sufficiently and the S/N ratio reduces, making it difficult to perform identification between the pipe propagation wave $W_2$ and the gas propagation wave $W_1$ as shown in FIG. 7.

FIG. 8 is a table indicating the S/N ratios of ultrasonic absorbers each having a different material. In FIG. 8, the pressure of gas flowing in the pipe A is 0.3 [MPa] and the ultrasonic wave transmitted by the first ultrasonic transceiver 20A and the second ultrasonic transceiver 20B has a frequency of 0.5 [MHz]. As illustrated in FIG. 8, when using an ultrasonic absorber including asphalt as the main material, the ratio (S/N ratio) between the maximum amplitude of the gas propagation wave $W_1$ and the maximum amplitude of the pipe propagation wave $W_2$ is 3.8. On the other hand, when using the ultrasonic absorber 10 including uncrosslinked butyl rubber, the S/N ratio is 7.4, which is approximately twice as large as the above value.

Although rubbers (rubber compositions) such as natural rubber and synthetic rubber have high vibration absorption performance, uncrosslinked butyl rubber is suited to the main material of the ultrasonic absorber 10 since it has an S/N ratio higher than other rubbers (rubber compositions) as illustrated in FIG. 8.

The ultrasonic absorber 10 is not limited to ultrasonic absorbers made of uncrosslinked butyl rubber or rubbers solely. The ultrasonic absorber 10 may include predetermined mixed particles to be mixed to uncrosslinked butyl rubber. With this, by mixing mixed particles for making the acoustic impedance to close to the acoustic impedance of the material of the pipe A and/or for improving the capability (absorption performance) of absorbing vibrations in the frequency band of ultrasonic waves into uncrosslinked butyl rubber or rubbers as predetermined mixed particles, the S/N ratio of the ultrasonic absorber 10 can be further improved.

As the predetermined mixed particles, there are, for example, metal particles made of tungsten or the like, metal compound particles made of ferrite or the like, or inorganic compound particles made of barium sulfate or the like. The shape of the particles is not limited to a sphere and may be a polyhedron, a sphere with bumps and dips on its surface, or the like. The shape is not limited to a particular shape as long as desired effects can be obtained.

FIG. 9 is a table indicating the S/N ratio of the ultrasonic absorber 10. In FIG. 9, the pressure of gas flowing in the pipe A is 0.3 [MPa] and the frequency of the ultrasonic wave transmitted by the first ultrasonic transceiver 20A and the second ultrasonic transceiver 20B is 0.5 [MHz]. As illustrated in FIG. 9, when the ultrasonic absorber 10 including only uncrosslinked butyl rubber is provided, the S/N ratio is 7.4 as described above. On the other hand, when the ultrasonic absorber 10 includes ferrite as the predetermined mixed particles 11, the S/N ratio is 8.9. When the ultrasonic absorber 10 includes tungsten, the S/N ratio is 11.7. When the ultrasonic absorber 10 includes barium sulfate, the S/N ratio is 34.2. As compared with the ultrasonic absorber 10 including only uncrosslinked butyl rubber, the S/N ratio is further improved.

Figure 10:
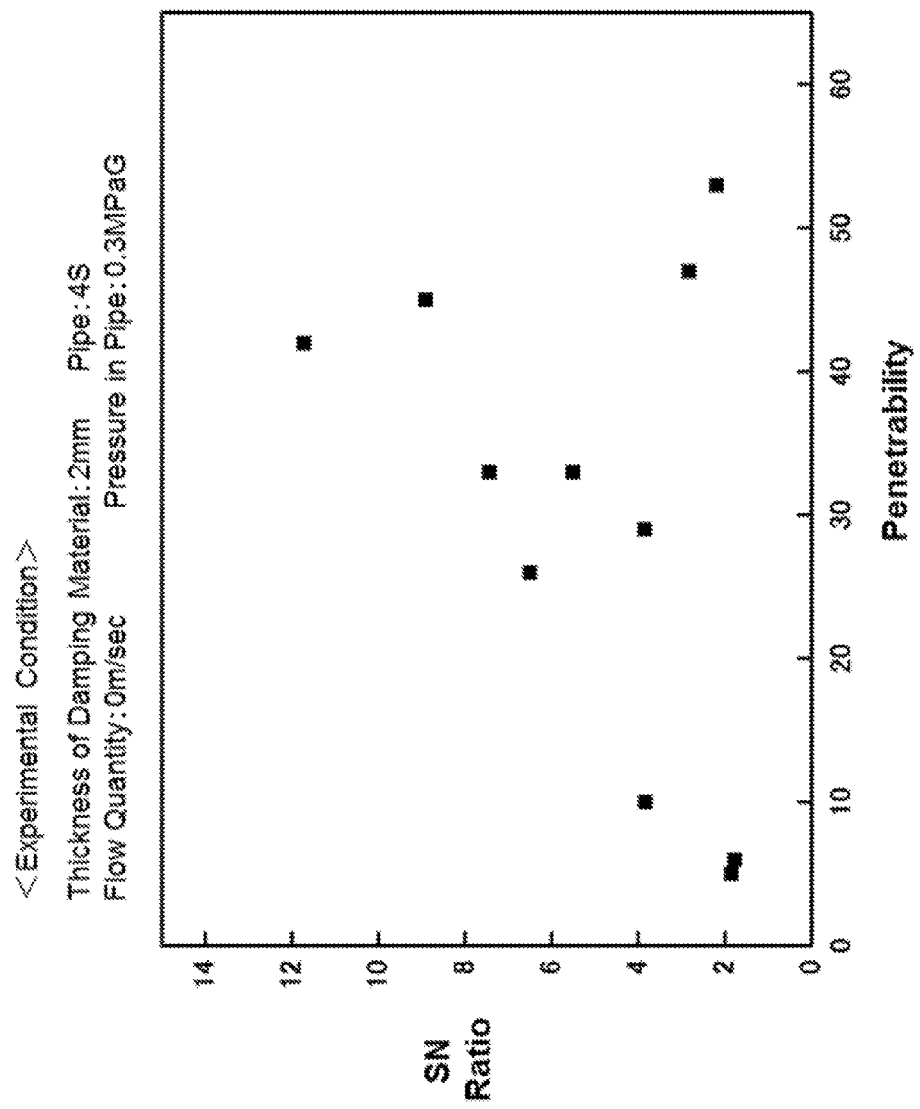
FIG. 10 is a graph illustrating the relationship between the viscoelasticity (penetrability) and the S/N ratio of the ultrasonic absorber.
Figure 11:
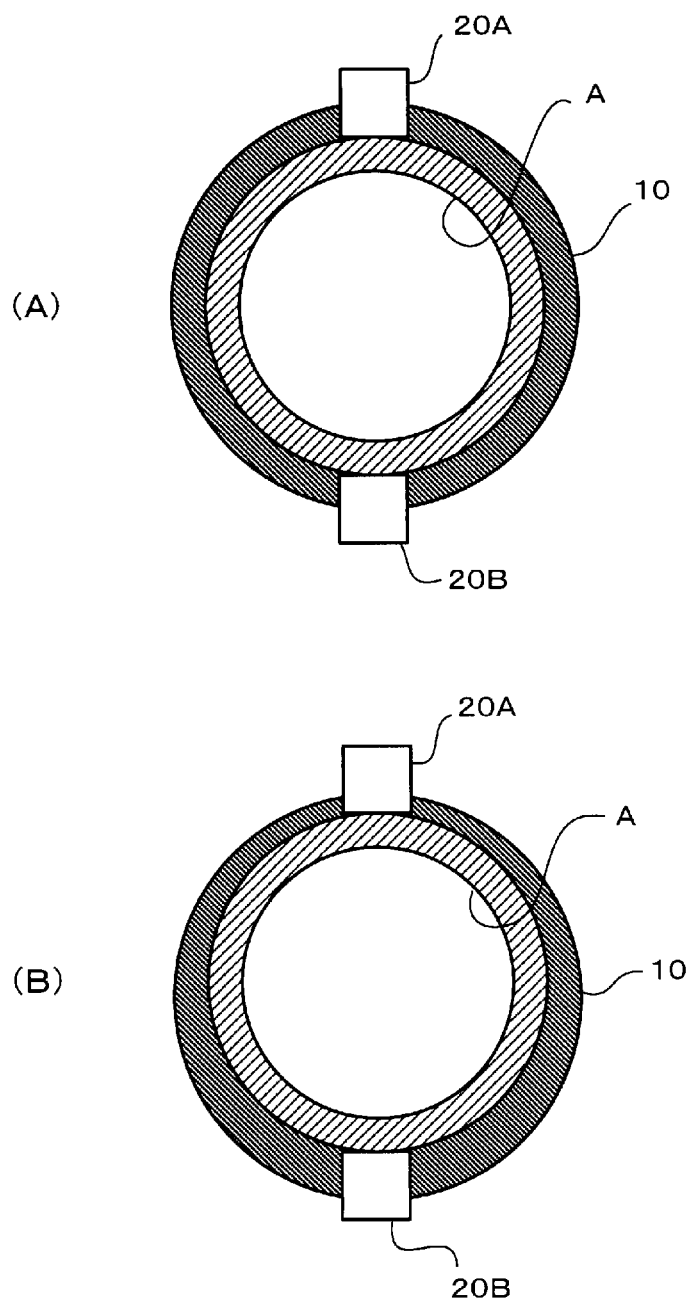
FIG. 11 is an explanatory diagram illustrating the deformation of the ultrasonic absorber.

FIG. 10 is a graph indicating the relationship between the viscoelasticity of the ultrasonic absorber and the S/N ratio of the reception signal of the ultrasonic flowmeter. The vertical axis represents the S/N ratio and the horizontal axis represents the viscoelasticity (penetrability). The ultrasonic absorber is formed by uncrosslinked butyl rubber and various viscoelasticities are set by adjusting additives. The film thickness of the ultrasonic absorber formed on the outer periphery of the pipe A is 2 [mm], the pressure of gas in the pipe A is 0.3 [MPa], and the frequency of the ultrasonic wave transmitted by the first ultrasonic transceiver 20A and the second ultrasonic transceiver 20B is 0.5 [MHz]. The pipe A is a stainless steel sanitary pipe (JIS G3447, outer diameter of 101.6 [mm], inner diameter of 97.6 [mm], thickness of 2.0[mm], common name of 4S) having a gas flow quantity of 0 [m/sec]. The viscoelasticity of the ultrasonic absorber was measured based on the penetrability in JIS2207 for the sake of convenience. A penetration distance of 0.1 [mm] when a test needle with a weight of 100 [g] is put on the ultrasonic absorber for five seconds at a temperature of 25° C. is assumed to be penetrability 1. The viscoelasticity is large (relatively soft) when the penetrability (viscoelasticity) value is large and the viscoelasticity is small (relatively hard) when the penetrability (viscoelasticity) value is small.

As illustrated in FIG. 10, it is found that, when the penetrability is approximately 10 to 45, the S/N ratio is improved as the penetrability increases. As an outline, the S/N ratio is approximately 4 when the penetrability is 10, the S/N ratio is approximately 7.4 when the penetrability is 33, the S/N ratio is approximately 12 when the penetrability is 42, and the S/N ratio is approximately 8 when the penetrability is 45. Although the S/N ratio is approximately 2 when the penetrability is 60, since butyl rubber is sticky and not practical, these values are not indicated in FIG. 10.

Therefore, the pipe propagation wave $W_2$ can be attenuated efficiently when the outer periphery of the pipe A is coated or covered with uncrosslinked butyl rubber having a large viscoelasticity as the ultrasonic absorber 10 as illustrated in FIG. 11(A). The pipe propagation wave $W_2$ can be further attenuated by increasing the thickness of the uncrosslinked butyl rubber film on the outer periphery of the pipe A.

However, since the ultrasonic absorber 10 is soft when the viscoelasticity is large and its weight further increases when the film thickness is large, the ultrasonic absorber 10 moves downward and deforms over time as illustrated in FIG. 11(B). When the ultrasonic absorber 10 includes metal particles and the like to adjust the acoustic impedance, the ultrasonic absorber 10 increases in weight and further deforms. As a result, after a long period of time, the thickness of the film of the ultrasonic absorber 10 that covers the pipe A becomes uneven, the capability of absorbing the energy of the pipe propagation wave $W_2$ degrades in the part in which the film thickness is small and the attenuation of noise components becomes insufficient. This means that the S/N ratio of the reception signal reduces over time.

Figure 12:
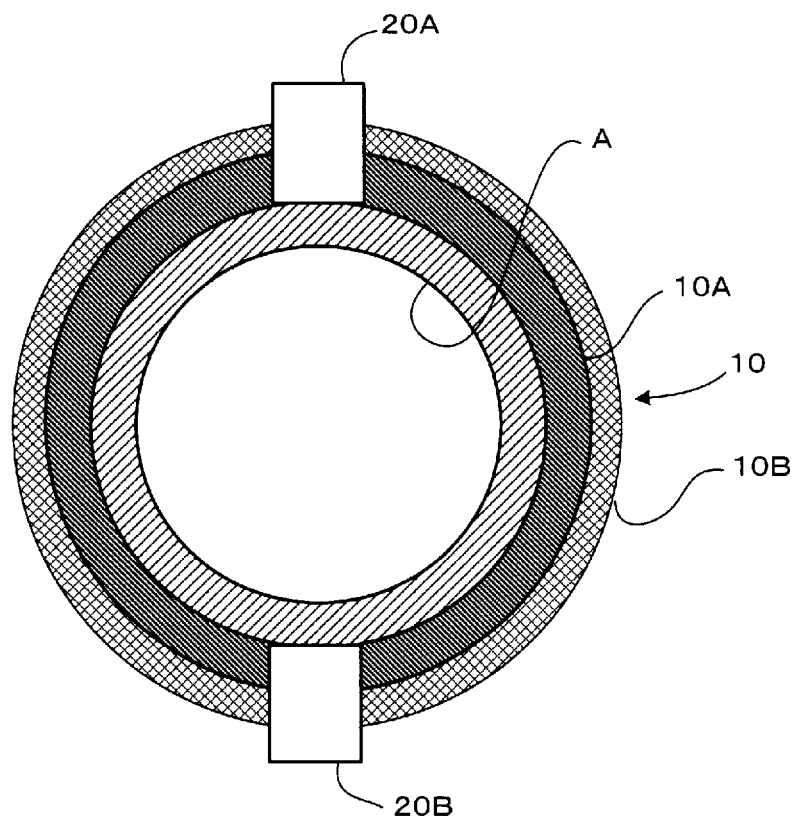
FIG. 12 is an explanatory diagram illustrating an example of forming the ultrasonic absorber using a plurality of layers each having a different flexibility.

FIG. 12 illustrates an example of the invention. In the example, the ultrasonic absorber 10 includes two layers 10a and 10b as illustrated in the drawing. The first layer makes close contact with the pipe A due to its self weldability and is a soft layer having a viscoelasticity (penetrability) relatively larger than the second layer. For example, the first layer is made of butyl rubber having a penetrability of 40. Self weldability causes adhesive butyl rubber to flow bit by bit over time and a very small space generated between the pipe surface and the butyl rubber to be filled. The second layer is a hard layer, having a viscoelasticity (penetrability) relatively smaller than the first layer, that makes close contact with the first layer due to its self weldability. For example, the second layer is made of butyl rubber having a penetrability of 5. Since the first layer is covered with the second layer harder than the first layer, deformation of the softer first layer is prevented.

In addition, to reduce the energy by diffusing the pipe propagation wave $W_2$ into the ultrasonic absorber 10, an attempt is made to reduce reflection of the pipe propagation wave $W_2$ on the interface between the pipe A and the first layer 10A and the interface between the first layer 10A and the second layer 10B. For this purpose, it is necessary to make the acoustic impedances of the pipe A, the first layer 10A, and the second layer 10B identical. The acoustic impedance Z is represented by the expression $Z=\rho \cdot C$ where $\rho$ is the density of a medium and C is the sound velocity in the medium.

In the example, particles for adjusting the acoustic impedance are mixed into the first layer 10A so that the pipe A and the first layer 10A have the same the acoustic impedance. For example, the diameter of particles is determined to be a value smaller than the wavelength of propagated sound depending on the thickness of the first layer. For example, the particles have a diameter of approximately 15 [μm]. In addition, the particles adjusted to have the same total weight as in the first layer 10A are mixed into the second layer 10B so that the second layer 10B has the same acoustic impedance as the first layer 10A. The diameter of particles in the second layer is determined to be a value smaller than the wavelength of propagated sound depending on the thickness of the second layer. For example, the particles have a proper diameter equal to or more than 15 [μm]. By making adjustment so that they have substantially the same acoustic impedance as described above, the pipe propagation wave $W_2$ is scattered and attenuated by propagating from the first layer 10A to the second layer 10B and noise components are absorbed. The noise absorption performance of the entire ultrasonic absorber 10 is improved.

Figure 13:
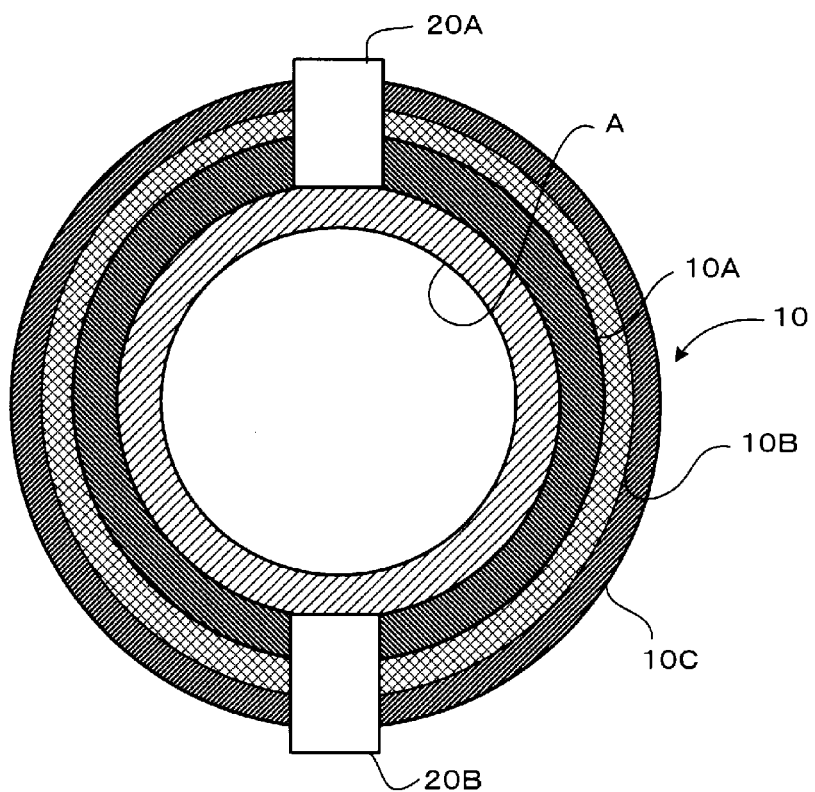
FIG. 13 is an explanatory diagram illustrating another example of forming the ultrasonic absorber using a plurality of layers each having a different flexibility.

FIG. 13 illustrates another example of the invention in which the ultrasonic absorber 10 includes three rubber layers 10A to 10C. In the example in which the ultrasonic absorber 10 includes a plurality of layers in this way, if the outermost rubber layer 10C is harder than inner rubber layers, deformation of the ultrasonic absorber 10 can be prevented. In addition, if particles to be mixed into the layers are adjusted so that the layers have similar acoustic impedances, reflection on the layer interface of the pipe propagation wave $W_2$ can be reduced.

As described above, according to the examples of the invention, when the area having good noise absorption properties (S/N ratio) in a damping material such as rubbers is soft and thereby has insufficient deformation resistance, it is possible to prevent the thickness of the damping material from becoming uneven by covering the damping material with hard rubbers that do not easily deform.

In addition, it is not easy to wind hard rubber around a small-diameter pipe because of the repulsive force of the rubber. However, since the first rubber adhering to the outer periphery of the pipe is soft in the examples, the first rubber can be relatively easily provided as an ultrasonic absorber even when the pipe diameter is small. Since the outer diameter of the pipe is increased by adhesion of the first rubber, the second rubber, which is harder than the first rubber, can be relatively easily wound. When the second rubber has self weldability, the second rubber can be wound more easily.

In addition, when the acoustic impedances of a plurality of rubber layers are similar to each other, the pipe propagation wave $W_2$, which is the noise component of the reception signal of an ultrasonic flow rate meter, can be attenuated conveniently by diffusing it into the ultrasonic absorber.

INDUSTRIAL APPLICABILITY

The invention can be conveniently applied to the ultrasonic flow quantity measurement of fluid such as air, cool wind, warm wind, steam, hot water, cool water, and various types of gas.

REFERENCE SIGNS LIST

10: ultrasonic absorber
10A: first rubber layer
10B: second rubber layer
10C: third rubber layer
20A: first ultrasonic transceiver
20B: second ultrasonic transceiver
21: wedge
21a: bottom surface
21b: oblique surface
22: piezoelectric element
50: main unit
51: switching unit
52: transmission circuit unit
53: reception circuit unit
54: clocking unit
55: calculation control unit
56: input output unit
100: ultrasonic flowmeter
A: pipe
$W_1$: gas propagation wave
$W_2$: pipe propagation wave

The invention claimed is:
1. An ultrasonic flowmeter comprising:
a first ultrasonic transceiver provided on a first part of an outer periphery on an upstream side of a conduit in which gas flows;
a second ultrasonic transceiver provided on a second part of the outer periphery on a downstream side of the conduit;
a main unit measuring a flow quantity of the gas based on a downstream time from when a downstream ultrasonic wave transmitted from the first ultrasonic transceiver to when the downstream ultrasonic wave is received by the second ultrasonic transceiver and an upstream time from when an upstream ultrasonic wave transmitted from the second ultrasonic transceiver to when the upstream ultrasonic wave is received by the first ultrasonic transceiver; and
an ultrasonic absorber provided on the outer periphery of the conduit, the ultrasonic absorber absorbing the upstream and downstream ultrasonic waves propagating in the conduit,
wherein the ultrasonic absorber comprises a first uncrosslinked rubber layer formed on the outer periphery of the conduit and a second rubber layer formed on the first uncrosslinked rubber layer, and
the first uncrosslinked rubber layer has a viscoelasticity larger than the second rubber layer and the second rubber layer has a viscoelasticity smaller than the first uncrosslinked rubber layer and surrounds the first uncrosslinked rubber layer.
2. The ultrasonic flowmeter according to claim 1,
wherein filler particles in the first uncrosslinked rubber layer and the second rubber layer are adjusted so that an acoustic impedance of the first uncrosslinked rubber layer is equal to an acoustic impedance of the second rubber layer.

3. The ultrasonic flowmeter according to claim 2,
wherein the first uncrosslinked rubber layer and the second rubber layer are adjusted so that the acoustic impedance of the first uncrosslinked rubber layer is equal to the acoustic impedance of the second rubber layer by adjusting the filler particles in the first uncrosslinked rubber layer and the second rubber layer so that a total weight of the filler particles in the first uncrosslinked rubber layer is equal to a total weight of the filler particles in the second rubber layer.

4. The ultrasonic flowmeter according to claim 3,
wherein the filler particles in the first uncrosslinked rubber layer and the second rubber layer respectively comprise one of tungsten, ferrite, and barium sulfate.

5. An ultrasonic absorber for an ultrasonic flowmeter measuring a flow quantity of gas based on a downstream time from when a downstream ultrasonic wave transmitted from a first part of an outer periphery on an upstream side of a pipe in which the gas flows to when the ultrasonic wave is received at a second part of the outer periphery on a downstream side of the pipe and an upstream time from when an upstream ultrasonic wave transmitted from the second part of the outer periphery on the downstream side of the pipe to when the upstream ultrasonic wave is received at the first part of the outer periphery on the upstream side of the pipe, the ultrasonic absorber comprising:
a first uncrosslinked rubber layer formed between and including the first and second parts on the outer periphery of the pipe and a second rubber layer formed on the first uncrosslinked rubber layer,
wherein the first uncrosslinked rubber layer has a viscoelasticity larger than the second rubber layer and the second rubber layer has a viscoelasticity smaller than the first uncrosslinked rubber layer and surrounds the first uncrosslinked rubber layer.

6. The ultrasonic absorber for the ultrasonic flowmeter according to claim 5,
wherein an acoustic impedance of the first uncrosslinked rubber layer is made equal to an acoustic impedance of the second rubber layer by adjusting a total weight of filler particles included in the first uncrosslinked rubber layer and a total weight of filler particles included in the second rubber layer.

* * * * *